(12) United States Patent
Saleh et al.

(10) Patent No.: US 8,249,298 B2
(45) Date of Patent: Aug. 21, 2012

(54) ULTRASONIC CAMERA TRACKING SYSTEM AND ASSOCIATED METHODS

(75) Inventors: Youssef Saleh, Arlington, MA (US); Peter Chu, Lexington, MA (US); Jinwei Feng, Woburn, MA (US); Alain Nimri, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 1294 days.

(21) Appl. No.: 11/872,303

(22) Filed: Oct. 15, 2007

(65) Prior Publication Data

US 2008/0095401 A1     Apr. 24, 2008

Related U.S. Application Data

(60) Provisional application No. 60/862,132, filed on Oct. 19, 2006.

(51) Int. Cl.
*G06K 9/00* (2006.01)

(52) U.S. Cl. ......... 382/103; 382/104; 382/118; 382/143

(58) Field of Classification Search .................. 382/100, 382/102, 103; 348/14.09, 169, 16, 14.16, 348/14.08; 704/246, 218, 270; 359/296; 313/478, 474

See application file for complete search history.

(56) References Cited

U.S. PATENT DOCUMENTS

| | | | |
|---|---|---|---|
| 3,601,530 A | 8/1971 | Edson et al. | 178/5.6 |
| 4,264,928 A | 4/1981 | Schober | 358/125 |
| 4,400,724 A | 8/1983 | Fields | 358/85 |
| 4,494,144 A | 1/1985 | Brown | 358/133 |
| 4,516,156 A | 5/1985 | Fabris et al. | 358/85 |
| 4,529,840 A | 7/1985 | Colton et al. | 179/2 TS |
| 4,531,024 A | 7/1985 | Colton et al. | 179/2 TS |
| 4,536,887 A | 8/1985 | Kaneda et al. | 381/92 |
| 4,581,758 A | 4/1986 | Coker et al. | 381/56 |
| 4,596,041 A | 6/1986 | Mack | 455/53 |

(Continued)

FOREIGN PATENT DOCUMENTS

EP          0 356 105          2/1990

(Continued)

OTHER PUBLICATIONS

European Search Report for Appl. No. 07020491.2-2220, dated May 2, 2008, 7-pgs.

(Continued)

*Primary Examiner* — Matthew Bella
*Assistant Examiner* — Nancy Bitar
(74) *Attorney, Agent, or Firm* — Wong, Cabello, Lutsch, Rutherford & Bruculerri, LLP

(57) ABSTRACT

A camera tracking system includes a controllable camera, an array of microphones, and a controller. The microphones are positioned adjacent the controllable camera and are at least responsive to ultrasound emitted from a source. The microphones may additionally be capable of responding to sound in the audible spectrum. The controller receives ultrasound signals communicated from the microphones in response to ultrasound emitted from the source and processes the ultrasound signals to determine an at least approximate location of the source. Then, the controller sends one or more command signals to the controllable camera to direct at least approximately at the determined location of the source. The camera tracking system tracks the source as it moves and continues to emit ultrasound. The source can be an emitter pack having one or more ultrasonic transducers that produce tones that sweep form about 24-kHz to about 40-kHz.

25 Claims, 6 Drawing Sheets

U.S. PATENT DOCUMENTS

| | | | | |
|---|---|---|---|---|
| 4,688,045 A | 8/1987 | Knudsen | | 342/377 |
| 4,847,829 A | 7/1989 | Tompkins et al. | | 370/62 |
| 4,858,012 A | 8/1989 | Hino et al. | | 358/210 |
| 4,924,387 A | 5/1990 | Jeppesen | | 364/409 |
| 4,961,211 A | 10/1990 | Tsugane et al. | | 379/54 |
| 4,965,819 A | 10/1990 | Kannes | | 379/53 |
| 4,975,960 A | 12/1990 | Petajan | | 381/43 |
| 4,995,071 A | 2/1991 | Weber et al. | | 379/53 |
| 5,012,522 A | 4/1991 | Lambert | | 382/2 |
| 5,034,986 A | 7/1991 | Karmann et al. | | 382/1 |
| 5,058,170 A | 10/1991 | Kanamori et al. | | 381/92 |
| 5,068,735 A | 11/1991 | Tuchiya et al. | | 358/209 |
| 5,099,510 A | 3/1992 | Blinken, Jr. et al. | | 379/202 |
| 5,179,421 A | 1/1993 | Parker et al. | | 356/152 |
| 5,206,721 A | 4/1993 | Ashida et al. | | 358/85 |
| 5,268,734 A | 12/1993 | Parker et al. | | 356/152 |
| 5,272,526 A | 12/1993 | Yoneta et al. | | 358/85 |
| 5,280,530 A | 1/1994 | Trew et al. | | 382/1 |
| 5,323,470 A | 6/1994 | Kara et al. | | 382/1 |
| 5,335,011 A | 8/1994 | Addeo et al. | | 348/15 |
| 5,340,309 A | 8/1994 | Robertson | | 433/69 |
| 5,347,306 A | 9/1994 | Nitta | | 348/15 |
| 5,355,163 A | 10/1994 | Tomitaka | | 348/234 |
| 5,382,972 A | 1/1995 | Kannes | | 348/15 |
| 5,396,287 A | 3/1995 | Cho | | 348/211 |
| 5,416,513 A | 5/1995 | Morisaki | | 348/169 |
| 5,430,809 A | 7/1995 | Tomitaka | | 382/173 |
| 5,432,864 A | 7/1995 | Lu et al. | | 382/118 |
| 5,438,357 A | 8/1995 | McNelley | | 348/15 |
| 5,465,302 A | 11/1995 | Lazzari et al. | | 381/92 |
| 5,473,369 A | 12/1995 | Abe | | 348/15 |
| 5,497,430 A | 3/1996 | Sadovnik et al. | | 382/156 |
| 5,500,671 A | 3/1996 | Andersson et al. | | 348/15 |
| 5,512,939 A | 4/1996 | Zhou | | 348/17 |
| 5,528,289 A | 6/1996 | Cortjens et al. | | 348/211 |
| 5,546,125 A | 8/1996 | Tomitaka et al. | | 348/169 |
| 5,550,754 A | 8/1996 | McNelley et al. | | 364/514 |
| 5,550,928 A | 8/1996 | Lu et al. | | 382/116 |
| 5,552,823 A | 9/1996 | Kageyama | | 348/155 |
| 5,561,519 A | 10/1996 | Parker et al. | | 359/139.06 |
| 5,561,718 A | 10/1996 | Trew et al. | | 382/118 |
| 5,568,183 A | 10/1996 | Cortjens et al. | | 348/15 |
| 5,574,498 A | 11/1996 | Sakamoto et al. | | 348/169 |
| 5,581,620 A | 12/1996 | Brandstein et al. | | 381/92 |
| 5,583,565 A | 12/1996 | Cortjens et al. | | 348/15 |
| 5,625,410 A | 4/1997 | Washino et al. | | 348/154 |
| 5,631,697 A | 5/1997 | Nishimura et al. | | 348/172 |
| 5,631,699 A | 5/1997 | Saito | | 348/213 |
| 5,684,528 A | 11/1997 | Okutsu et al. | | 348/15 |
| 5,686,957 A | 11/1997 | Baker | | 348/36 |
| 5,714,997 A | 2/1998 | Anderson | | 348/39 |
| 5,715,325 A | 2/1998 | Bang et al. | | 382/118 |
| 5,719,622 A | 2/1998 | Conway | | 348/211 |
| 5,737,431 A | 4/1998 | Brandstein et al. | | 381/92 |
| 5,742,329 A | 4/1998 | Masunaga et al. | | 348/15 |
| 5,778,082 A * | 7/1998 | Chu et al. | | 381/92 |
| 5,844,599 A | 12/1998 | Hildin | | 348/15 |
| 5,852,669 A | 12/1998 | Eleftheriadis et al. | | 382/118 |
| 5,859,663 A | 1/1999 | Simon | | 348/15 |
| 5,900,907 A | 5/1999 | Malloy et al. | | 348/15 |
| 5,940,118 A | 8/1999 | Van Schyndel | | 348/14 |
| 5,940,188 A | 8/1999 | Kurozasa | | 358/436 |
| 5,959,667 A | 9/1999 | Maeng | | 348/213 |
| 6,005,610 A | 12/1999 | Pingali | | 348/15 |
| 6,008,837 A | 12/1999 | Yonezawa | | 348/15 |
| 6,014,167 A | 1/2000 | Suito et al. | | 348/169 |
| 6,188,777 B1 | 2/2001 | Darrell et al. | | 382/103 |
| 6,469,732 B1 * | 10/2002 | Chang et al. | | 348/14.08 |
| 6,590,604 B1 | 7/2003 | Tucker et al. | | 348/14.13 |
| 6,593,956 B1 * | 7/2003 | Potts et al. | | 348/14.09 |
| 6,710,797 B1 * | 3/2004 | McNelley et al. | | 348/14.16 |
| 6,731,334 B1 | 5/2004 | Maeng et al. | | 348/211.12 |
| 6,912,178 B2 | 6/2005 | Chu et al. | | 367/123 |
| 6,980,485 B2 | 12/2005 | McCaskill | | 367/119 |
| 7,209,160 B2 * | 4/2007 | McNelley et al. | | 348/14.16 |
| 7,623,156 B2 * | 11/2009 | Nimri et al. | | 348/211.12 |
| 2001/0055059 A1 | 12/2001 | Satoda | | |

FOREIGN PATENT DOCUMENTS

| | | |
|---|---|---|
| EP | 0 635 983 | 1/1995 |
| EP | 0 836 326 | 4/1998 |
| FR | 2 747 003 A | 10/1997 |
| FR | 2747003 | 10/1997 |
| GB | 2 267 755 A | 12/1993 |
| JP | 62-092687 | 4/1987 |
| JP | 04-122184 | 4/1992 |
| JP | 05-083809 | 12/1993 |
| JP | 06-105306 | 4/1994 |
| JP | 410021047 A | 1/1998 |
| JP | 11-041577 | 2/1999 |
| WO | 94 17636 | 8/1994 |

OTHER PUBLICATIONS

Office Action in Chinese counterpart application No. 200710169136.5, dated Aug. 21, 2009.

Translation of FR 2 747 003 to Pompier, 6-pgs.

Computer-generated English translation of Written Description obtained from JPO for Japanese Utility Model Application No. H04-018699 (Japanese Laid-Open Utility Model Pub No. H05-083809).

English Translation of Abstract for Japanese Utility Model Application No. H04-018699 (Japanese Laid-Open Utility Model Pub No. H05-083809).

Notification of Second Office Action in Chinese Counterpart Appl. No. 200710169136.5, dated Aug. 31, 2011.

Various materials regarding Vtel's "SmartTrak" product (1998), downloaded from www.vtel.com/support/catchall/smrtracks.htm; www.vtel.com/support/catchall/smartra.htm; www.vtel.com/support/catchall/strakgde.htm; and www.vtel.com/support/catchall/strkins.htm.

Information regarding PictureTel's Limelight product (1998), downloaded from www.polycom.com/common/pw_item_show_doc/0,1449,538,00.pdf.

PictureTel's "Concorde 4500 and System 400EX/ZX Troubleshooting Guide;" (1997) downloaded from www.polycom.com/common/pw_item_show_doc/0,1449,444,00.pdf.

PictureTel's "Concorde 4500 Software Version 6.11 Release Bulletin;" (1996) downloaded from www.polycom.com/common/pw_item_show_doc/0,1449,438,00.pdf.

PictureTel's "Venue2000 User's Notebook;" (1999) downloaded from www.polycom.com/common/pw_item_show_doc/0,1449,675,00.pdf.

Information regarding PictureTel's 760XL Videoconferencing System (2000), downloaded from www.polycom.com/common/_pw_item_show_doc/0,1449,427,00.pdf.

Silverman et al.; "The Huge Microphone Array (HMA);" May 1996 (published at http://www.lems.brown.edu/array/papers/).

Sturim et al.; " Tracking Multiple Talkers Using Microphone Array Measurements;" Apr. 1997; (published at http://www.lems.brown.edu/array/papers/).

Brandstein et al.; "A Robust Method for Speech Signal Time-Delay Estimation in Reverberant Rooms;" Apr. 1997 (published at http://www.lems.brown.edu/array/papers/).

Brandstein et al.; "A Closed-Form Location Estimator for Use with Room Environment Microphone Arrays;" Jan. 1997 (published at http://www.lems.brown.edu/array/papers/).

Brandstein et al.; "A Closed-Form Method for Finding Source Locations from Microphone-Array Time-Delay Estimates;" Jan. 1997 (published at http://www.lems.brown.edu/array/papers/).

J. E. Adcock; "Optimal Filtering and Speech Recognition with Microphone Arrays;" Doctoral Thesis, Brown University; May 2001 (published at http://www.lems.brown.edu/array/papers/).

Brandstein et al.; "Microphone Array Localization Error Estimation with Application to Sensor Placement;" Jun. 1996 (published at http://www.lems.brown.edu/array/papers/).

Adcock et al.; "Practical Issues in the Use of a Frequency-Domain Delay Estimator for Microphone-Array Applications;" Nov. 1994 (published at http://www.lems.brown.edu/array/papers/).

Brandstein et al.; "A Practical Time-Delay Estimator for Localizing Speech Sources with a Microphone Array;" Sep. 1995 (published at http://www.lems.brown.edu/array/papers/).

M. S. Brandstein; Abstract of "A Framework for Speech Source Localization Using Sensor Arrays" Doctoral Thesis Brown University; May 1995 (published at http://www.lems.brown.edu/array/papers/).

Meuse et al.; "Characterization of Talker Radiation Pattern Using a Microphone-Array;" May 1996 (published at http://www.lems.brown.edu/array/papers/).

Brandstein et al.; "A Localization-Error Based Method for Microphone-Array Design;" May 1996 (published at http://www.lems.brown.edu/array/papers/).

J. E. Adcock; "Microphone-Array Speech Recognition via Incremental MAP Training;" May 1996 (published at http://www.lems.brown.edu/array/papers/).

Brandstein et al.; "Microphone Arrays: Signal Processing Techniques and Applications;" pp. 157-201 (Springer, 2001).

Various materials regarding Aethra's Vega Star Gold product; downloaded from www.if2000.de/daten/ae/vi/vegastargolden.pdf; Jun. 2003 and www.aethra.com/eng/producctsservices/videocommunication/vegastargold.asp.

"Intelligent Working Spaces;" Chapter 5; 2002 (downloaded from www.itc.it/abstracts2002/chapter5.pdf).

Vahedian et al.; "Estimation of Speaker Position Using Audio Information;" vol. 1, Dec. 2, 1997; pp. 181-184.

Wang et al.; "A Hybrid Real-Time Face Tracking System;" ICASSP '98 Proceedings, IEEE International Conference on Acoustics, Speech, and Signal Processing, vol. 6 of 6 Communications Audio . . . (1998).

Office Action in Japanese counterpart application No. 2007-271854, dated Aug. 11, 2009.

* cited by examiner

ULTRASONIC CAMERA TRACKING SYSTEM AND ASSOCIATED METHODS

CROSS-REFERENCE TO RELATED APPLICATIONS

This application claims the benefit of U.S. Provisional Application Ser. No. 60/862,132, filed 19 Oct. 2006, and entitled "Ultrasonic Camera Tracking System and Associated Methods," which is incorporated herein by reference and to which priority is claimed.

BACKGROUND

Presenters typically use hand-held remotes to control a camera of a videoconferencing system. However, a goal for videoconferencing is to produce a natural experience for participants. Therefore, it is not desirable to require the presenter or other participants to spend a great deal of time controlling the camera and handling complex input devices.

Some prior art techniques for camera tracking are disclosed in U.S. Pat. Nos. 5,844,599; 6,731,334, and 6,980,485. For example, U.S. Pat. No. 6,980,485 assigned to Polycom, Inc. discloses an automatic camera tracking technique that uses beamforming. In addition, Polycom offers a voice tracking system called Automatic Camera Positioning or ACP for its VSX videoconferencing system. Another prior art system uses color code-based tracking and vision analysis to track a target with a camera.

Although effective, some of the prior art systems can have limitations in some respects and can be difficult to maintain. In voice tracking, for example, the camera may point to a wall or a table from time to time due to reflection or other causes. In addition, the camera may not be able to track someone while moving if that person is not speaking. Furthermore, these prior art technique run into problems in situations where there are multiple voices or different color codes.

The subject matter of the present disclosure is directed to overcoming, or at least reducing the effects of, one or more of the problems set forth above.

SUMMARY OF THE DISCLOSURE

A camera tracking system includes a controllable camera, an array of microphones, and a controller. The microphones are positioned adjacent the controllable camera and are at least responsive to ultrasound emitted from a source. The microphones may additionally be capable of responding to sound in an audible spectrum. The controller receives ultrasound signals communicated from the microphones in response to ultrasound emitted from the source and processes the ultrasound signals to determine an at least approximate location of the source. Then, the controller sends one or more command signals to the controllable camera to direct it at least approximately at the determined location of the source. The camera tracking system tracks the source as it moves and continues to emit ultrasound. The source can be an emitter pack worn by a person. The emitter pack can have one or more ultrasound transducers that produce an ultrasound tone that sweeps form about 24-kHz to about 40-kHz.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

Figure 1:
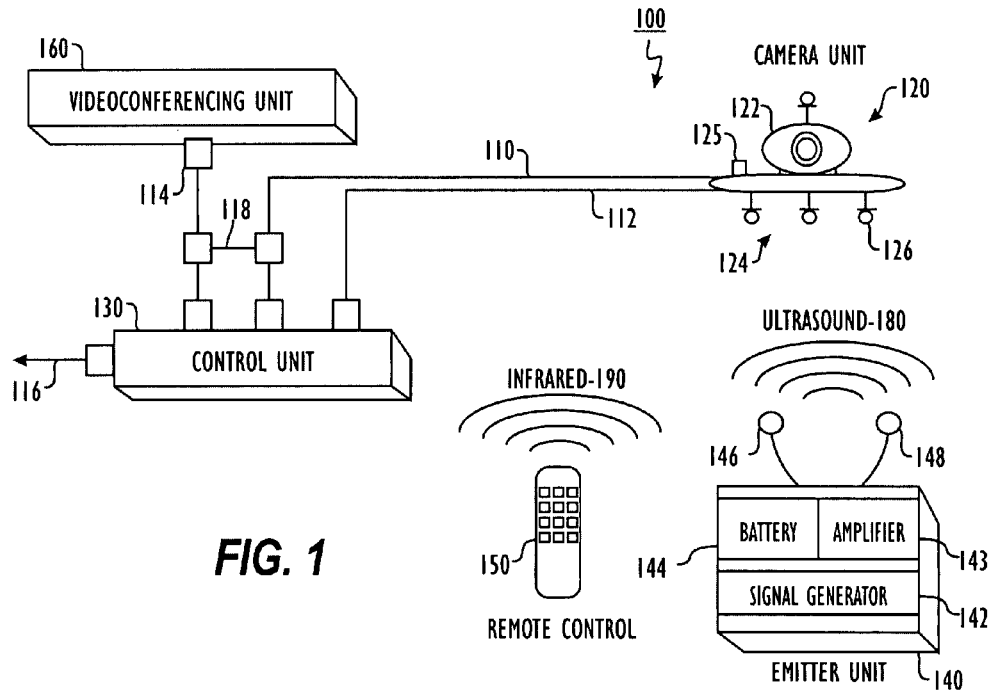
FIG. 1 illustrates one embodiment of a camera tracking system according to certain teachings of the present disclosure.

While the subject matter of the present disclosure is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring to FIG. 1, one embodiment of a camera tracking system 100 according to certain teachings of the present disclosure is schematically illustrated. The camera tracking system 100 includes a camera unit 120, a control unit 130, and an emitter unit 140. A presenter wears or carries the emitter unit 140 that acts as a beacon so that the camera unit 120 can follow the presenter by detecting the emitted beacon signal.

In various embodiments, the camera tracking system 100 can be used with a remote control 150 and can be used with an external device 160, such as a videoconferencing system or other system. The camera unit 120 and the control unit 130 can be separate components as shown, or they can be integrated into one unit. In addition, although the external device 160 is shown as a separate component, either one or both of the camera unit 120 and control unit 130 can be integrated with the external device 160.

In the present embodiment, the control unit 130 controls camera tracking and other features of the system 100. The control unit 130 includes a processor (not shown) for performing necessary calculations to perform the camera tracking techniques disclosed herein. The processor can be any device that can make the necessary calculations such as a Central Processing Unit (CPU), Field Programmable Gated Array (FPGA), and the like. The control unit 130 can receive standard NTSC, PAL s-video or other type of video sent from the camera unit 120 via a first connection 110. The control unit 130 also receives a plurality of channels (e.g., four) of line level audio from the camera unit 120 via the connection 110.

Via a second connection 112, the control unit 130 can communicate controls for the camera unit 120. Via a third connection 114, the control unit 130 can connect to the external device 160, such as a videoconferencing unit. This third connection 114 can allow can be used for sending video, audio, and other signals to the external device 160. This third connection 114 can also allow the external device 160 to use and control the camera unit 120 for videoconferencing. For example, the control unit 130 can support a PowerCam Application Programming Interface (API) or a Sony EVI D-100 API so the control unit 130 can pass packets back and forth between the external device 160 and the camera unit 120. The third connection 114 and a fourth connection 116 can be used to output video that can just contain the video from the camera unit 120 or that can contain the video plus any overlay of a graphical user interface added by the control unit 130.

The camera unit 120 includes a controllable camera 122 and an array 124 of microphones 126. The controllable camera 122 can be capable of panning, tilting, and zooming and can be a mechanical or electronic pan-tilt-zoom camera. In one example, the controllable camera 122 is a Polycom PowerCam Plus capable of panning about ±45-degrees and tilting +10 degrees and −30 degrees from a center point. The camera unit 120 provides an s-video (PAL or NTSC) or other form of video signal to the control unit 130 via connection 110. The camera unit 120 also responds to commands communicated from the control unit 130 via connection 112 to change the pan, tilt, and/or zoom of the controllable camera 122. In addition, the camera unit 122 can include an IR receiver 125 and can send signals received from the IR remote control 150 to the control unit 130 via connection 110.

In one embodiment, the array 124 includes four microphones 126. At least two microphones 126 can have a horizontal arrangement for determining location of the emitter unit 140 to control the panning of the camera 122 along a horizontal axis. Likewise, at least two microphones 126 can have a vertical arrangement for determining location of the emitter unit 140 to control the tilting of the camera 122 along a vertical axis. It will be appreciated that two of the microphones 126 can be arranged substantially horizontal to an acceptable tolerance recognizable by one skilled in the art that enables sufficient horizontal tracking. Moreover, it will be appreciated that two of the microphones 126 can be arranged substantially vertical to an acceptable tolerance recognizable by one skilled in the art that enables sufficient vertical tracking.

The microphones 126 of the array 124 respond to ultrasound in an ultrasonic spectrum emitted by the emitter unit 140. In one embodiment, the microphones 126 of the array 124 may be particularly configured for response in an ultrasonic spectrum so that the system 100 may have additional microphones for responding to sound in an audible spectrum, which in general can be about 20-Hz to 20,000-Hz. In another embodiment, each microphone 126 of the array 124 may be responsive to an audible spectrum and may provide a suitable frequency response for an ultrasonic spectrum as well so the microphones 126 can be used for regular audio of a videoconference and for camera tracking based on ultrasound 180. In addition, the camera unit 120 can use the dual-use microphones 126 in conjunction with voice tracking techniques associated with videoconferencing systems, such as disclosed in incorporated U.S. Pat. No. 6,980,485 or used in Polycom's iPower, VSX, and HDX series of products.

The emitter unit 140 has a signal generator circuit 142, a power amplifier 143, a rechargeable battery 144, and one or more transducers or speakers 146 and 148. As noted briefly above, the emitter unit 140 is carried or worn by the person that the camera 122 is intended to track. Accordingly, the emitter unit 140 can have a belt, a clip, lanyard, or other means (not shown) for it to be worn or carried by a person.

When operated, the emitter unit 140 generates an ultrasound 180 that is detected by the microphones 126 of the array 124. Preferably, the ultrasound 180 is a repeating tone that sweeps through frequencies from 24-kHz to 40-kHz over a 100-ms interval and that has a short silent interval of about 100-ms between tones. To produce the preferred sweep tone of ultrasound 180, the sampling frequency of the signal generator circuit 142 can be at 96-kHz, and the signal generator circuit 142 can include a clock oscillator that oscillates at 24.576-MHz at 50-ppm, such as an EPSON SG-710ECK24.5760MB, RALTRON C04305-24.5760, SARONIX S 1613B-24.5760T. Preferably, the emitter unit 140 has a Low Pass Filter for a Digital to Analog converter of the unit 140, and at least a 60 dB stopband attenuation is preferably used at 56-kHz and above. The transition band is 40 kHz to 56 kHz, and the Digital to Analog converter can be an AK4386 from AKM Semiconductor, Inc.

The emitter unit 140 can have only one ultrasonic transducer 146 or can have two or more ultrasonic transducers 146 and 148. Either way, the ultrasonic transducer 146/148 is connected to the emitter unit 140 by wire and can be a piezoelectric transducer (piezoelectric crystals can change shape for producing sound when subjected to a voltage) or a magnetostrictive transducer (magnetostrictive materials convert magnetic energy into mechanical energy and vice versa). In embodiments where the emitter unit 140 includes more than one transducer 146 and 148, for example, the presenter can wear one of the transducers 146 on the front of the body and can wear the other transducer 148 on the back of the body. Alternatively, one of the transducers 146 and 148 can be worn on each shoulder. In one embodiment, each transducer 146 and 148 can be synchronized to emit identical signals of ultrasound 180. In an alternative embodiment, the transducer 146 and 148 can emit distinct signals of ultrasound 180 that may enhance the ability of the camera 122 to track a person for the various ways in which the person's body can be oriented with respect to the array 124 of microphones 126.

When emitted ultrasound 180 is obtained with the microphones 126, the camera unit 120 sends ultrasound signals for each microphone 126 to the control unit 130 via connection 110. The control unit 130 processes the received signals to determine an at least approximate location of emitter unit 140 where the sound originated. As discussed in more detail below, software of the control unit 130 processes the received signals to locate the emitter unit 140. After determining the location, the control unit 130 sends one or more command signals to the camera unit 120 to control the camera 22 to at least approximately track the emitter unit 140.

Determining the location of the emitter unit 140 can be approximate within acceptable degrees of pan, tilt, and/or zoom recognizable by one skilled in the art that will enable the camera 22 to be sufficiently directed at the presenter wearing the unit 140. Moreover, directing the camera 22 at the presenter with the emitter unit 140 and tracking that presenter can be approximate within acceptable degrees of pan, tilt, and/or zoom recognizable by one skilled in the art that will enable a sufficient image of the presenter to be captured by the camera 22. To that end, at least four microphones 126 are set at two orthogonal axes that can vary according to acceptable tolerances. The control unit 100 can further set up to operate the system in only a defined tracking area outside of which the camera 22 will not be pointed. In addition, the control unit 100 can be set up to operate the camera 22 such that it offers a tight or wide view of the presenter and offers a view in which the presenter (i.e., emitter location) is either located in the center, right, or left of the captured image.

During a presentation or videoconference, for example, the control unit 130 controls the camera 122 to track the person wearing the emitter unit 140. When the tracked person is moving and then stops, the speed of the camera 122's movement (e.g., pan and tilt) is preferably controlled by first slowing down and then stopping to point at the person. For example, the camera 122 may come to rest and point at the person within a 2-seconds time period to make the camera motion smoother and to prevent jerky movement in the event the person starts moving again. These parameters may be configurable by the user.

There may be situations where the person is moving slightly but still within the frame or view angle of the camera 122. Preferably, the camera 122 does not follow the person in a jerky motion when this is the case, and the camera 122 is intended to remain stationary when the person moves slightly within the view angle of the camera 122. To achieve this, the control unit 130 can determine the view angle of the camera 122 and can correlate the view angle with the determined location of the person. Based on the correlation, the control unit 130 can determine whether the person has moved outside a frame of the camera 122 before initiating commands to move the camera 122 to track the person. In addition, when the person does move outside of the camera 122's frame, the camera 122 may not be move until a delay period of about 500-ms has passed.

Figure 2:
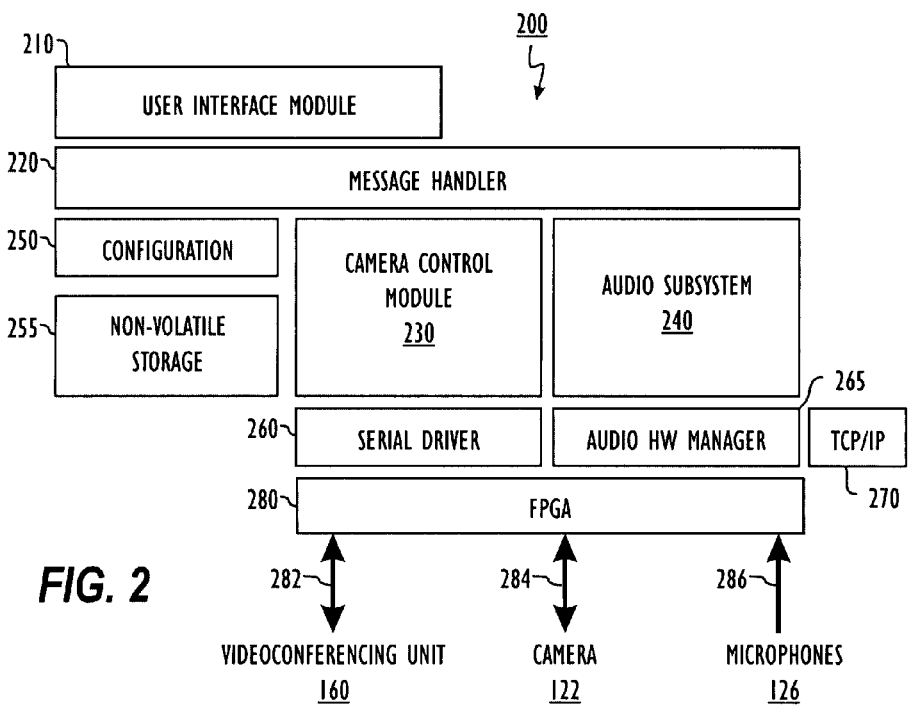
FIG. 2 illustrates one embodiment of a software framework for a control unit of the camera tracking system of FIG. 1.

Now that details of the camera tracking system 100 have been discussed, we now turn to FIG. 2 to discuss software for the control unit 130. As shown FIG. 2, one embodiment of a control unit's software framework 200 includes a user interface module 210, a message handler 220, a camera control module 230, an audio subsystem 240, a configuration module 250, a storage module 255, a serial driver 260, an audio hardware manager 265, a TCP/IP module 270, and a Field Programmable Gateway Array (FPGA) 280.

The UI module 210 sends command message strings to the other modules and subsystems of the framework 200 via the message handler 220. The user interface (UI) module 210 handles IR remote button presses from a user and overlays text and graphics on video output for displaying an on-screen menu system for the user. For example, the UI module 210 can handle user inputs for setting and recalling presets, turning auto tracking on and off, and selecting menu mode. In addition, the UI module 210 can generate various warning screen, setup screens, calibration screens, informational screens, and other visuals on screens for display to users.

The audio subsystem 240 receives the ultrasound input from the camera's microphones 126 via interface 286, the FPGA 280, and audio hardware manager driver 265. Using techniques discussed in more detail below, the audio subsystem 240 filters and analyzes the ultrasound signals from the microphones 126 to determine the angular position of the ultrasound emitter (not shown) of the source in both a horizontal and vertical direction. The audio subsystem 240 also determines an approximate distance of the emitter from the camera 122 (or alternatively the microphones 126 positioned adjacent the camera 122). The audio subsystem 240 periodically sends this position information to the camera control module 230 so that the camera control module 230 can control the camera 122 accordingly.

The camera control module 230 handles all camera-related motion for both manual and automatic modes of operation. During the automatic mode of operation where the source is to be automatically tracked, the camera control module 230 receives the position information associated with the source from the audio subsystem 240 and converts that position information into camera movement commands. The camera control module 230 then sends the camera movement commands to the camera 122 via the serial driver 260, FPGA 280, and interface 284. The commands preferably obtain smooth camera motion to follow the targeted source. When an optional interface 282 is used for an external device (e.g., videoconferencing unit 160), the camera control module 230 can forward camera serial commands received from the external device 160 to the camera 122 via another interface 284 and can also return the camera 120's responses back to the external device 160.

Figure 3A:
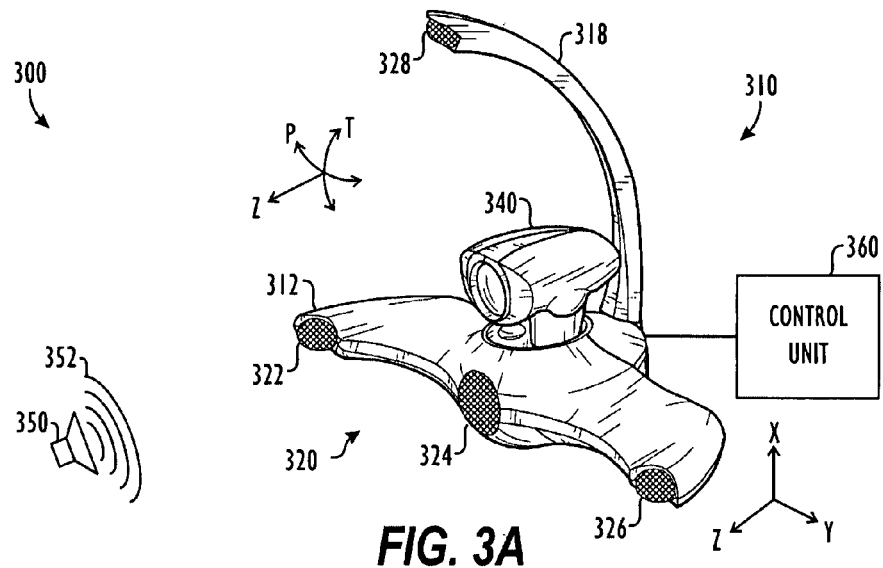
FIG. 3A illustrates one embodiment of a camera unit for a camera tracking system.

With an understanding of software for a control unit, we now turn to FIG. 3A to discuss a preferred embodiment of a camera unit 310 illustrated relative to components of a camera tracking system 300. As described previously, the camera unit 310 is communicatively coupled to the control unit 360. In addition, the control unit 360 may or may not be connected to an external device (not shown), such as a videoconferencing unit, a video monitor, computer, etc.

The camera unit 310 has a housing 312 for various components, a boom 318 connected to the housing 312, a plurality of microphone receivers 320 arranged in an array, a moveable camera 340 atop the housing 312, and other components not shown.

Three of the microphone receivers 320 (i.e., receivers 322, 324, and 326) are arranged horizontally on the housing 312. In addition, one of the microphone receivers 320 (i.e., receiver 328) is positioned in the boom 318 and is vertically arranged relative to the center microphone receiver 324 on the housing 312. The position of the ultrasonic transducer 350 in space relative to the camera unit 310 can be characterized using a Cartesian coordinate system (X, Y, Z). The ultrasonic transducer 350 emits ultrasound 352 that the microphone receivers 320 pick up. Processing performed at least in part by the control unit 360 determines the position of the ultrasonic transducer 350 and moves the camera 340 to track the ultrasonic transducer 350's position. Using a position determination algorithm discussed below, phase differences in the ultrasound 352 received by the horizontally arranged microphone receivers 322, 324, and 326 determines the ultrasonic transducer 350's horizontal position relative to the camera unit 310, which corresponds to a pan position P for the camera 340. Phase differences in the ultrasound 352 received by the vertically arranged microphone receivers 324 and 328 determine the ultrasonic transducer 310's vertical position relative to the camera unit 310, which corresponds to a tilt position T of the camera 340. In one embodiment, accuracy of about 0.125-degrees in both the pan and tilt positions may be achieved using the position determination algorithm discussed below.

Furthermore, the wavefront curvature of the ultrasound 352 received by the horizontally arranged microphone receivers 322, 324, and 326 can be used to determine the ultrasonic transducer 310's distance from the camera unit 310, which corresponds to the zoom position Z of the camera 340. In addition or in the alternative, other techniques can be used to determine the distance that the ultrasonic transducer 350 is from the the camera unit 310. As discussed later in additional embodiments, for example, Radio Frequency (RF) signals and wireless microphone signals can be used. The focus of the camera 340 can be controlled using techniques known in the art.

Figure 3B:
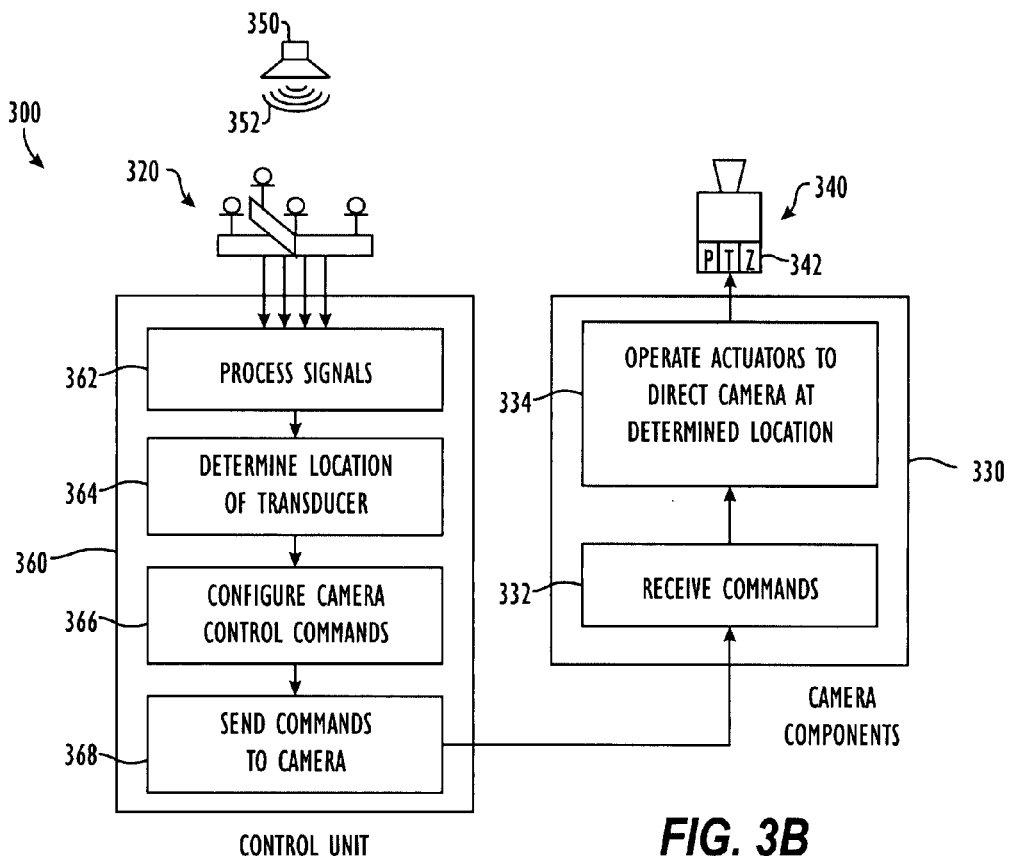
FIG. 3B illustrates one embodiment of a signal chain for the camera tracking system of FIG. 3A.

In FIG. 3B, the signal chain for the camera tracking system 300 of FIG. 3A is diagrammatically illustrated. In the signal chain, the ultrasonic transducer 350 emits ultrasound 352 as the targeted source (i.e., user) wearing or carrying the transducer 350 moves relative to the microphone receivers 320. The signals of the ultrasound 352 received by each of the microphone receivers 320 are then sent to the control unit 360 so that the control unit 360 receives four channels of input signals. In turn, the control unit 330, which can have one or more digital signal processors, processes the signals (Block 362). Some details of the processing are discussed later with reference to FIGS. 4A-4B.

The control unit 360 then uses a position determination algorithm to determine approximately the vertical position, the horizontal position, and the distance (e.g., X, Y, Z) of the ultrasonic transducer 350 relative to the receivers 320 (Block 364). The position determination algorithm is discussed in detail later with reference to FIG. 5. Using the determined position (X, Y, Z), the control unit 360 configures camera control commands (Block 366) and sends those commands to the camera (Block 368). To configure the camera control commands, the control unit 360 may convert the determined position (e.g., X, Y, Z) of the ultrasonic transducer 350 into pan, tilt, and zoom information for actuators, servos, or the like 342 of the camera 340. The camera components 330 receive the commands and uses them to direct the camera 340 at the determined position of the ultrasonic transducer 350 (Block 344).

The ultrasonic transducer 350 for the disclosed tracking system 350 is preferably a piezoelectric ultrasonic transducer having a wide bandwidth, good sensitivity, low distortion, and a small thickness. In one embodiment, for example, the ultrasonic transducer 350 has a reasonably flat frequency response in a frequency range of 24-kHz to 40-kHz, but it will be appreciated that the camera tracking system 300 is not limited to the bandwidth of 24-kHz to 40-kHz. To be reasonably flat, for example, the frequency response may fluctuate within ±5% of its given level or within some other suitable tolerance depending on the implementation. Moreover, the limits of the bandwith of 24-kHz to 40-kHz can differ by plus or minus several kHz or some other suitable amount depending on the implementation.

The ultrasonic receivers 320 preferably have a substantially flat frequency response at least up to 40-khz. A suitable ultrasonic receiver 320 for the disclosed camera tracking system 300 are the WM61B and WM64 receivers from Panasonic that have a substantially flat frequency response up to 40-kHz. How flat the frequency response is or would need to be for a given implementation falls within the relative skill of one in the art having the benefit of the present disclosure.

Figure 4A:
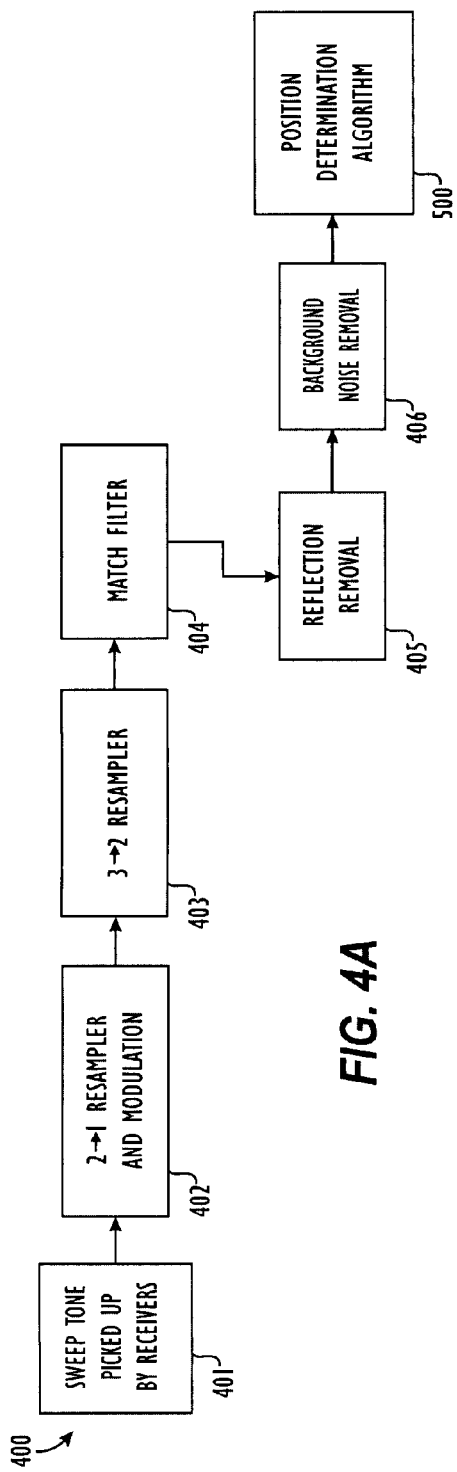
FIG. 4A illustrates one embodiment of a down-sampling process to reduce ultrasonic signals to an audible range for the disclosed camera tracking system.

The processing in Block 362 by the control unit 300 preferably involves down-sampling and other filter operations on the signals form the microphone receivers 320 to improve later processing stages of the signals. FIG. 4A shows a block diagram of down-sampling and filtering operations 400 for reducing the ultrasound signal to the audible range and improving signal attributes. Initially, the ultrasonic transducer (350) emits ultrasound that sweeps within the 24-kHz to 40-kHz range. In a first stage 401, this sweep tone is picked up by each of the microphone receivers (320). One advantages of using the sweep tone rather than a band-limited white noise signal is that the sweep tone signal makes the ultrasonic transducer (350) less audible to people due to non-linear distortion. In another advantage, the use of the sweep tone yields a higher signal-to-noise ratio than a white noise signal. In this first stage 401, the 24-kHz to 40-kHz sweep tone signal picked up by each of the microphone receivers (321) is digitally sampled at 96-kHz, as shown by graph 410 of FIG. 4B.

Because each of the microphone receivers (320) picks up the sweep tone, the control unit 360 can perform some processing separately on the signals from each of the microphone receivers (320) and can perform additional processing on the summation of the signals from all of the receivers (320). In the following stages, however, it is preferred that the processing be performed separately on the signals from each of the receivers (320). It is not until initial processing is completed that the signals will be summed together.

Figure 4B:
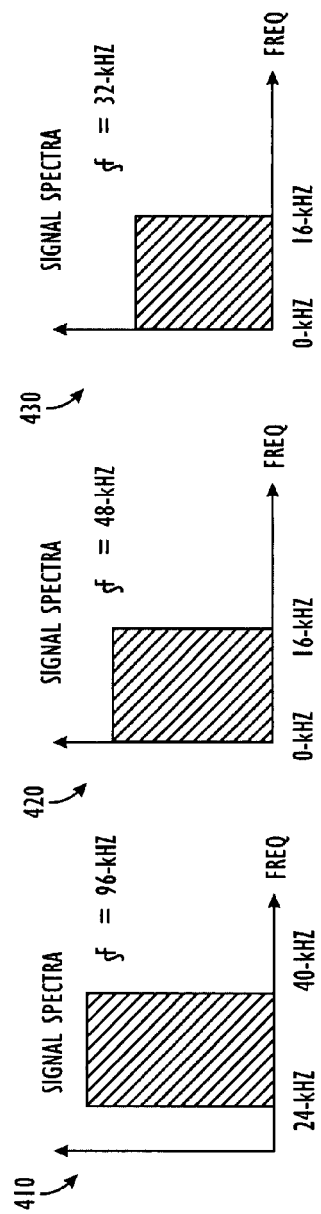
FIG. 4B illustrate graphs of signal spectra during stages of the down-sampling process of FIG. 4A.

In a second stage 402, a two-to-one resampler and modulation module of the control unit (360) shifts the spectrum of the sampled sweep tone signals from 24~48-kHz to 0~24-kHz and produces an output sampling rate of 48-kHz, as shown in graph 420 of FIG. 4B. In a third stage 403, a three-to-two resampler of the control unit (360) produces a signal with a frequency range from 0-kHz to 16-kHz, as shown by graph 430 of FIG. 4B. The output of the three-to-two resampler carries the same information as the original received signals at stage 401, however, the output at this stage 403 is at much lower sampling rate of 32-kHz that helps reduce computations required during later processing.

In a fourth stage 404, a match filter compresses the energy in each of the sweep tone signals over a time interval so that the energy is concentrated in an impulse-like waveform for each of the signals of the receivers (320). In this way, the match filtering can enhance the signal-to-noise ratio and can increase the potential tracking range of the system (300). Matching filtering techniques are known in the art and are not detailed herein.

The ideal output signal after the match filter stage 404 is an impulse waveform or a waveform that is very close to an impulse. For the down-sampling and filter operations 400, there are six possible shapes of impulses that depend on the phase of the original, received signal because the sweep tone is still a band-limited signal when the sampling rate is 96-kHz, which leads to a poly-phase output when down-sampled.

In a fifth stage 405, a reflection removal algorithm removes portions of the impulsive-like waveform outputs after match filtering in stage 404 that may be caused by reflection. The reflection removal algorithm preferably keeps the impulse of the signals that substantially correspond to a direct path to the ultrasonic transducer (350) and removes any part of the signals that follow the impulse for a specific amount of time. In one example, the reflection removal may keep 0.5-ms of the impulse of the signals and may zero-out about 39-ms of time following the impulse. Preferably, the reflection removal algorithm uses a dynamic threshold to identify the impulse of the signals that correspond to the direct path to the transducer (350) because the dynamic range of the time-domain signal can vary. Variance in the dynamic range over time can result when the ultrasonic transducer (350) moves about in a large room and turns with respect to the microphone receivers (320) from time to time. The reflection removal algorithm first tracks maximum values of the signals in short periods of time that have just passed and sets the dynamic thresholds to be about one-eighth those maximum values.

In addition to reflection removal, it may be preferred that the waveforms of the signals received from the match filter stage 404 be equalized. For example, the output signals from match filter stage 404 may be more complex than impulse waveforms due to imperfect frequency responses and other causes. To make the output signals from the match filter stage 404 be more pulse-like, waveform equalization is preferably performed on the signals to compensate for the imperfect frequency responses of the ultrasonic transducer (350) and the receivers (320).

Furthermore, it is noted that the microphone receivers (320) may also pick up some spurious ultrasonic tones in the background that can be as much as 20 to 30 dB above the noise floor. The background noise may be generated by surrounding electronic equipment, such as desktops, computers, TV sets, etc., and can reduce the measurement accuracy to some degree. In a sixth stage 406 for background noise removal, the control unit (360) preferably uses a background noise estimator and an adaptive notch filter to remove some of the background noise. During operation, the estimator detects automatically whether the ultrasonic transducer (350) is turned on or off and hence emitting ultrasound by analyzing the received signals statistically. At various intervals, the estimator captures the signal to estimate the background noise level. This process may only take about one second. Then, the adaptive notch filter is preferably used to remove at least some of the background tones.

Once the down-sampling and other filter operations 400 have been performed, the processed signals from the microphone receivers (320) are input into a position determination algorithm 500. Briefly, the position determination algorithm 500 estimates a maximum likelihood that the ultrasonic transducer (350) is located in a candidate location of a plurality of possible locations. In this approach, the location of the ultrasonic transducer (350) is initially hypothesized to be at each of many possible candidate locations in its environment (e.g., a room). For each candidate location, the signals from the microphone receivers (320) are appropriately delayed relative to one another and are summed together using a delay-sum operation. The result yields the maximum possible beam energy for any of the available frequencies.

Then, a whitening filter is used across each frequency and each microphone receiver (320) so that each frequency and each receiver (320) is equally important in adding to the total energy. Then, various candidate locations are searched for the one candidate location that yields the maximum beam energy of all the hypothesized candidate locations. This candidate location is declared as the estimated location of the transducer (350). In general, the various time delays needed to sum samples from the microphone receivers (320) are fractional values, and there may be hundreds or thousands of candidate locations to search. Preferably, to reduce computational expense, the search for candidate locations uses a computationally efficient process.

Figure 5A:
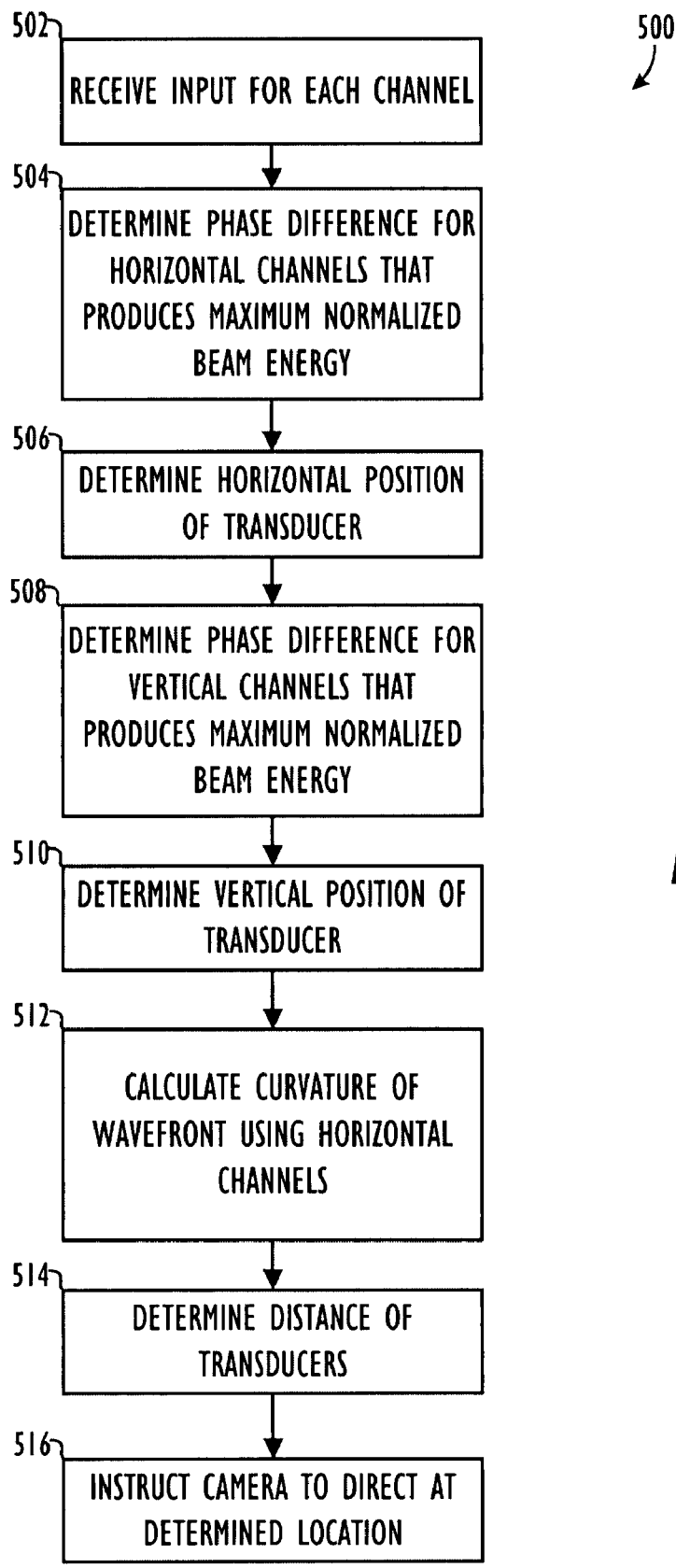
FIGS. 5A-5B illustrate one embodiment of a position determination algorithm to estimate a candidate location of a targeted source for the disclosed camera tracking system.

One embodiment of a position determination algorithm 500 to estimate a candidate location of an ultrasonic transducer (350) is shown in FIG. 5A in flowchart form. The algorithm 500 receives four channels of signals as input (Block 502). In the present embodiment, each channel corresponds to the down-sampled and filtered portion of the received signals of ultrasound (352) from the four microphone receivers (320). Next, the algorithm 500 determines the phase difference for the horizontal channels (i.e., each horizontally arranged microphone receivers (320)) that produces the maximum normalized beam energy (Block 504). The steps of (Block 504) are discussed in more detail with reference to FIG. 5B. Then, this determined phase difference is then used to determine the horizontal position of the transducer (350) and hence the pan position for the camera (340) (Block 506).

Figure 5B:
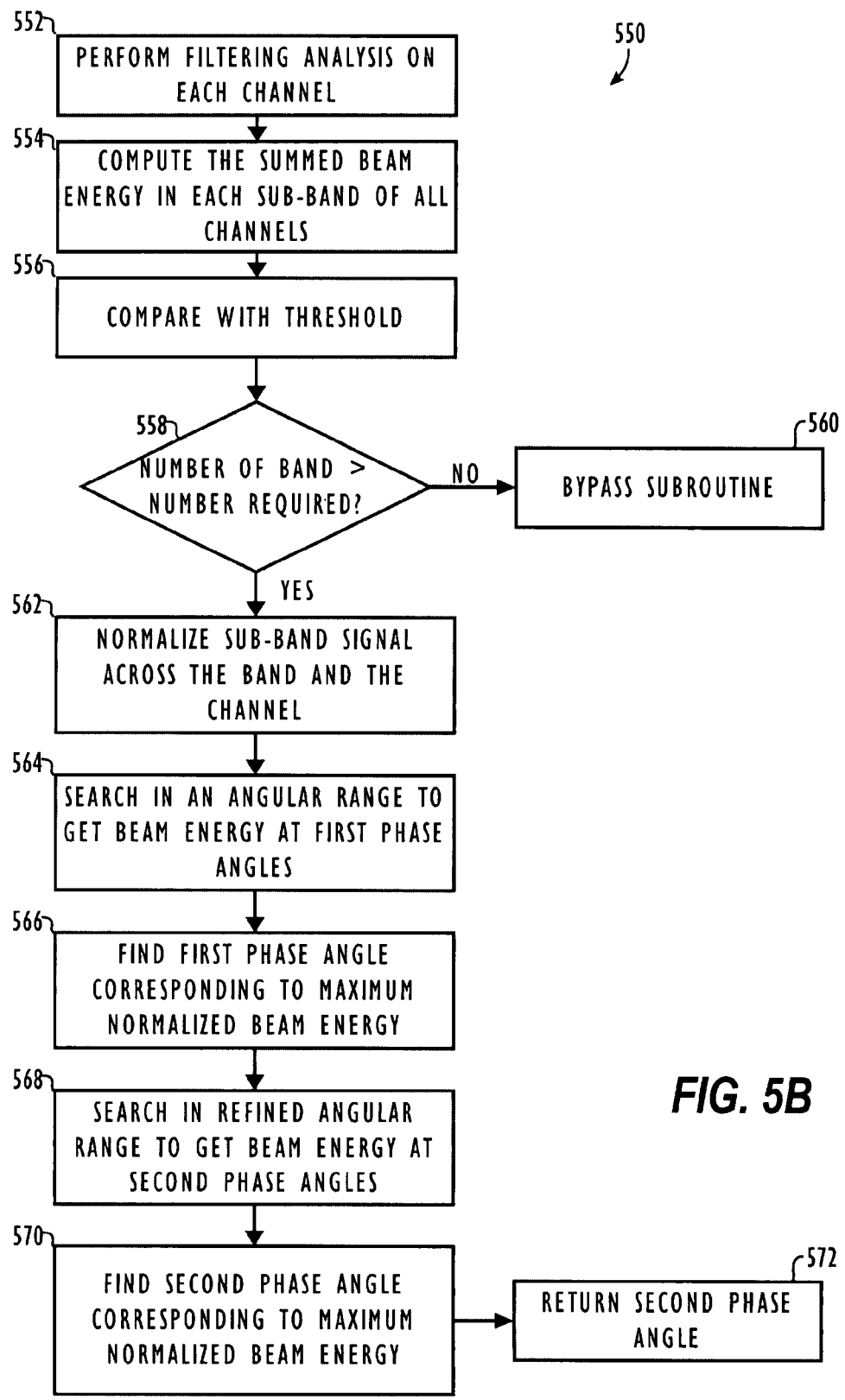

Then, the algorithm 500 determines the phase difference for vertical channels (i.e., each vertically arranged microphone receivers (320)) that produces the maximum normalized beam energy (Block 508) by repeating the steps of FIG. 5B for the vertical receivers 320. This determined phase difference is then used to determine the vertical position of the transducer (350) and hence the tilt position for the camera (340) (Block 510).

Subsequently, the algorithm 500 calculates the curvature of the wavefront of the ultrasound (352) detected at the horizontally arranged microphone receivers (320) (Block 512) and uses the curvature to calculate the distance of the transducer (350) and hence the zoom position for the camera (340) (Block 514). Finally, the control unit (360) instructs the camera (340) to direct at the determined location of the emitter (350) (Block 516).

In FIG. 5B, steps 550 are illustrated for determining the phase difference of channels that produces the maximum normalized beam energy. First, filtering analysis is performed on each channel (Block 552). The summed beam energy is then computed in each sub-band of all of the channels (Block 554). The summed energy is compared with a predetermined threshold (Block 556) to determine if the number of bands is greater than number required (Block 558). If not, then the subroutine is bypassed altogether because there may not be enough signal information to process (Block 560).

If the number of bands is greater than the required number, then the sub-band signals are normalized across the band and the channel (Block 562). A sweeping search in an angular range of phases is made to get beam energy at a plurality of first phase angles (Block 564). From that search, the first phase angle corresponding to the maximum normalized beam energy is found (Block 566). Then, a sweeping search is made in a more refined angular range of phase angles about the previously found first phase angle to get beam energy at a plurality of second phase angles (Block 568). From that refined search, the second phase angle corresponding to the maximum normalized beam energy is found (Block 670). At the finial Block 572, this second phase angle is then returned either to Block 504 or 508 of FIG. 5A depending on whether horizontal or vertical arrangement is being analyzed.

We now turn to a more detailed discussion of the position determination algorithm. To perform the filtering analysis on each channel in Block 552 of FIG. 5B, M channels of ultrasonic receiver signals are fed to an equal number of Analog to Digital (A/D) converters. The A/D converters convert the ultrasonic receiver signals into digital samples. For each ultrasonic receiver channel M, a block of N samples is accumulated for processing. In a preferred embodiment, the number of samples N is 640. The resulting input data is characterized as:

$$X_m(n) \qquad (1)$$

where m=0, 1, . . . , M−1 (M being number of channels) and where n=0, 1, . . . , N−1 (N being the number of samples for each channel). Next, the M number of blocks of the N samples are fed to an overlap-add filter-bank that generates, in one embodiment, N complex frequencies for each channel. Consequently, the ultrasonic receiver signals in the time domain are converted to filter-bank outputs that can be characterized as:

$$H_m(k) \rightarrow X_m(n) \qquad (2)$$

The filter-bank outputs $H_m(k)$ are complex having a real and an imaginary component. Here, k is a frequency band that can be translated to a frequency bin number. Every time a block of N samples occurs in a predetermined time domain, a new set of filter-bank outputs $H_m(k)$ is produced. If the input signal for a given ultrasonic receiver $X_m(n)$ is a sine wave of a frequency centered in one of the bands, call it k', of the filter-bank output $H_m(k)$, then filter-bank output $H_m(k)$ for that centered band k' would be large in magnitude while all the other $H_m(k)$ for k≠k' will be smaller in magnitude.

As noted above in Block 554, the summed beam energy in each sub-band of all of the channels is computed. First, the signals are normalized. Equation (3) computes the normalized signals so that only the phase angle of the complex signals will be used in calculating the beam energy:

$$F_m(k) = \frac{H_m(k)}{\|H_m(k)\|} \quad (3)$$

Next, a delay-and-sum operation alluded to above is performed on each frequency domain. If a sub-band is narrow enough, it may be viewed as a sinusoid, so that a time-delay may be approximated by multiplying the complex signal by a phasor $e^{j\theta}$ so that:

$$F'_m(k) = e^{j\theta} F_m(k) \quad (4)$$

where θ is the appropriate phase angle that would occur if the sine wave were delayed by the desired amount of time. For a particular frequency sub-band, k, the delay-and-sum operation is calculated by:

$$G_{x,y,z}(k) = \sum_{m=0}^{M-1} e^{j\theta_m} F_m(k) \quad (5)$$

Here, $\theta_m$ represents a particular phase angle that would maximize the magnitude of the summed value of $G_{x,y,z}(k)$ given a hypothetical location of the transducer (350) at a location (x, y, z). Because sound arrives at the microphone receivers (320) with different time-of-arrivals, equation (5) attempts to compensate for these different times so that the different ultrasonic receiver signals can be added up as if the signals arrived at all the microphone receivers (320) at exactly the same time (i.e., the signals did not arrive out of phase).

To calculate the appropriate phase angle $\theta_m$ for equation (5) that would maximize the magnitude of the summed value of $G_{x,y,z}(k)$ given a hypothetical location of the transducer (350) at a location (x, y, z), it is assumed that the transducer source (350) is located at a position $X_s, Y_s, Z_s$ in a Cartesian coordinate system and that the M (e.g., four) microphone receivers (320) are located at positions $X_m, Y_m, Z_m$. Then, the distance between the transducer (350) and the m-th microphone receivers (320) is calculated by:

$$D_m = \sqrt{(X_s - X_m)^2 + (Y_s - Y_m)^2 + (Z_s - Z_m)^2} \quad (6)$$

By picking one of the microphone receivers (320) as a reference, say m', the difference in distance D between the reference receiver m' and the other receivers is characterized by:

$$\Delta_m = D_m - D_{m'} \quad (7)$$

In addition, the difference in phase angle for a given frequency bin of band k between the reference receiver m' and the other receivers is characterized by:

$$\phi_m = -2\pi(24{,}000 + kb)\Delta_m v \quad (8)$$

where b is the Hertz-per-bin for the sub-band filter, i.e., the center frequency of the sub-band filter is 24,000+kb Hertz. The number 24,000 is derived from the spectrum shift discussed previously with reference to FIGS. 4A-4B. The term $\Delta_m$ is the differential distance between receivers (320) in inches, and v is a constant that is proportional to the reciprocal of the speed of sound (1/(13.54*1000)). To cancel out the phase shift in equation (8), $\theta_m$ in equation (5) is set to:

$$\theta_m = \phi_m \quad (9)$$

In general, $\theta_m$ in equation (9) will be different for each frequency bin, of the band k, and each ultrasonic receiver m.

Each hypothetical position $G_{x,y,z}(k)$ of the transducer (350) in equation (5) is found for the band k ranging from the lowest frequency bin to the highest frequency bin (i.e., spanning the range from 24-kHz to 40-kHz that translates to 0 to 639 in frequency bin number). The following location weighting function is finally determined:

$$W(x, y, z) = \sum_{k=low}^{high} \|G_{x,y,z}(k)\|^2 \quad (10)$$

The candidate position (x, y, z) for the transducer (350) that produces the maximum value for the location weighing function W(x, y, z) in equation (10) is determined to be the estimated position of the transducer (350).

To reduce computational cost as well as improve detection accuracy, the location weighting function W(x, y, z) in equation (10) is computed only occasionally (e.g., every P blocks). In a preferred embodiment, P is 5, which corresponds to a calculation about every 0.1 seconds. Furthermore, the frequency sub-band data, $H_m(k)$, can be trimmed both in time and frequency so that only the most useful data that occurred over the last P blocks is used to calculate the location weighting function W(x, y, z) at the end of the time period of P blocks.

Accordingly, discussion now turns to some steps for trimming the frequency sub-band data and performing only occasional calculations of the location weighting function W(x, y, z). Over a time period of P blocks, for each frequency bin of the band k, the data from the Multrasonic receivers (320) may be characterized by:

$$H_m^p(k) \quad (11)$$

where p=0, 1, ..., P−1 and m=0, 1, ..., M−1.

To finding a hypothetical position G(x, y, z) for a given frequency bin of the band k, $$H_m^{p'}(k)$$

is chosen in a particular time period of p', where the magnitude $$\|H_{m'}^{p'}(k)\|^2$$

is greatest over p=0,1, ..., P−1 for a single ultrasonic receiver m' and the index p', where p' can range from 0 to P−1. This magnitude is compared to the background noise magnitude for the frequency bin. If this magnitude is too close to the background noise in strength, then the normalized signal $$F_m^{p'}(k)$$

for all m, since inclusion of this data would simply make the result more erroneous. Thus, for a given frequency bin k, the hypothetical position is characterized by:

$$G_{x,y,z}(k) = \sum_{m=0}^{M-1} e^{j\theta_m} F_m^{p'}(k) \qquad (12)$$

Equation (12) is then used in equation (10) to find the maximum value of the location weighting function W(x, y, z). For some frequency bins of the bands k where the signal energy is close to the noise energy, then the position $G_{x,y,z}(k)$ will be zero. If the number of the non-zero frequency bins is too small, the entire computation is bypassed because the data of the last P blocks is probably only attributable to noise.

In equation (12), the phasor term $e^{j\theta_m}$ is a transcendental function and has an imaginary part and a real part, which are different for each frequency bin k and each hypothesized source position x, y, z. Accordingly, it would be inefficient to compute it at run-time with the control unit (360). Preferably, values are pre-computed and stored in one or more lookup tables in memory so the control unit (360) can access the tables to perform calculations during run-time.

In one embodiment for pre-computing lockup tables, the time block size can be N=640, the number of frequency bins can also be 640, the frequently span from low to high can be all 640 frequencies, the number of ultrasonic receivers M can be 4, and the number of hypothesized source positions can be 8640 (i.e., 180-degrees in ¼ degree increments at 48 distances). The number of entries in a resulting table would be:

No. of Entries=2×640×16×8640=176,947,200 (13)

To offer 16-bit precision, the memory required to store this table would be about 350-megabytes, which may be prohibitive in terms of memory size for a typical implementation.

To reduce the table size, the real part for the phasor term $e^{j\theta_m}$ in equation (12) can be characterized by:

$$\cos(\theta_m)=\cos(2\pi \cdot kb\Delta_m v) \text{ and } \cos\theta_m=\cos(k\Delta_m c) \qquad (14)$$

where c is a constant for all k and m. Because the cosine function repeats every $2\pi$ of the argument, it is then possible to efficiently calculate $\cos(\theta_m)$ by first calculating the product $k\Delta_m c$, taking this product modulo $2\pi$, and then looking up the result in a table of the cosine function.

Instead of independently computing equation (14), two pre-computed lookup tables can be stored in memory of the control unit (360) and can be used to reduce computations. A first pre-computed lookup table D(r, m) is produced for the camera tracking system (300), where r is an index uniquely specifying a hypothetical position (x, y, z) of the transducer (350) in 3-Dimensional space and where m is the ultrasonic receiver index. The entries for this pre-computed lookup table D(r, m) can be characterized by:

$$D(r,m)=b\times(0.001/13.54)\times\Delta_{r,m}\times 512 \qquad (15)$$

for all r and for m=0, 1, . . . , M−1. In equation (15), b=(center frequency of bin)/k, and $\Delta_{r,m}$ is the signal path difference between a microphone m and a reference microphone in inches for a source location as indexed by r.

A second pre-computed modulo cosine table cos_table(i) is also produced and is defined as:

$$\cos\_table(i)=\cos(\pi\times i/256), \text{ where } i=0, \ldots 512 \qquad (16)$$

Using these tables D(r, m) and cos_table(i), a value of $\cos(\theta_m)$ for a candidate location r of the transducer (350) and frequency bin k can be found using:

$$\cos(\theta_m)=\cos\_table[0x1FF \& \text{int}(k\times D(r, m))] \qquad (17)$$

where & is the "and" function (masking with 0x1FF), and where "int" means "round to the nearest integer."

Thus, the control unit (360) preferably uses these two tables D(r, m) and cos_table(i) to compute a solution for $\cos(\theta_m)$ of equation (14). In the present example, the D(r, m) table has 8640×4 or 34,560 locations, and the cos_table(i) table has 512 locations. To calculate $\sin(\theta_m)$, a similar procedure to equation (17) is used to produce another table, called sin_table(i), that has 512 locations. Thus, the tables have 35,584 entries in total, which may be a practical size for a given implementation of the camera tracking system.

The resulting values for $\cos(\theta_m)$ and $\sin(\theta_m)$ determined by the lookup tables are then used to estimate the phasor term $e^{j\theta_m}$ in equation (12) to calculate a candidate position $G_{x,y,z}(k)$ for a given frequency bin k. Then, the value of the candidate position $G_{x,y,z}(k)$ is used in the location weighting function W(x, y, z) equation (10) to calculating the location weight for a candidate position. Eventually, the position (x, y, z) that yields the maximum value of the location weighting function W(x, y, z) for equation (10) is declared as an estimated position of the transducer (350). Ultimately, this estimated position of the transducer (350) can be used for tracking the source with the camera of the camera unit (310).

As noted previously at Block 564 of FIG. 5B to reduce computation, a first search is made to determine beam energy at a first plurality of candidate locations using the equations and techniques discussed above. Preferably, this first search is coarse to reduce computational costs so that a coarse estimate of an at least approximate location of the transducer (350) can be determined at Block 566. The first coarse search is then followed by a more refined second search focused about the coarse estimate in Block 564 to find a refined location with the greatest normalized beam energy using the equations and techniques discussed above. The searches are performed for both the horizontal arrangement of microphone receivers (320) and the vertical arrangement of receivers (320) to determine the location of the transducer (350) relative to the pan and tilt angles of the camera unit respectively. The camera of the camera unit (310) can then be operated to direct (i.e., pan, tilt, and zoom) at the determined location.

Figure 6A:
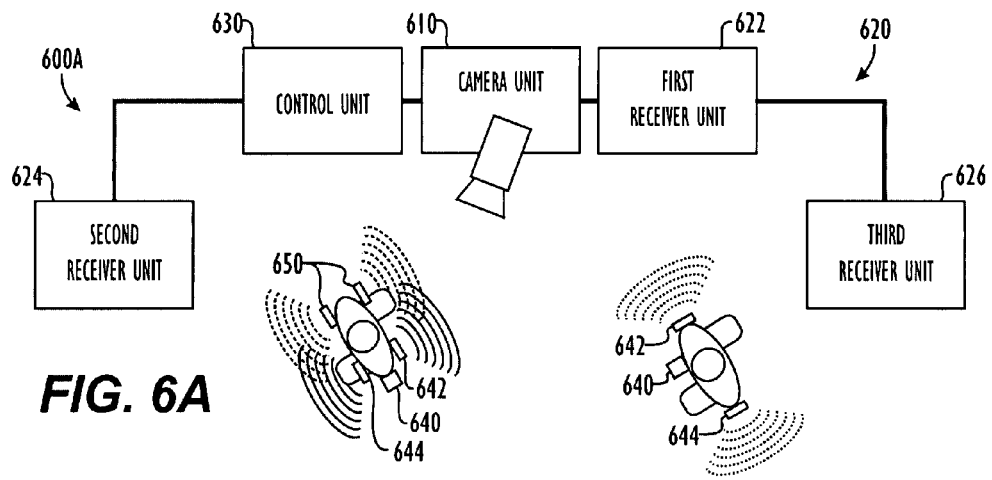
FIGS. 6A-6B illustrate other embodiments of camera tracking systems.
Figure 6B:
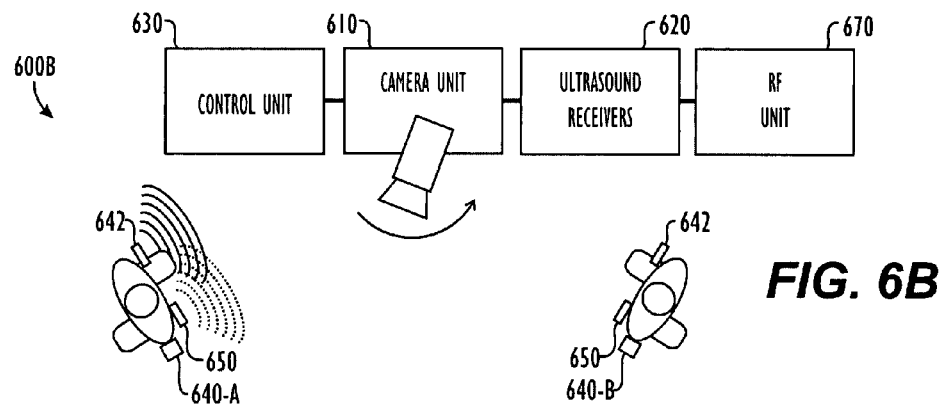

Turning to FIGS. 6A-6B, some additional and alternative embodiments of camera tracking systems of the present disclosure will be discussed. In general, the embodiments of the camera tracking system discussed previously have described the camera unit, such as unit 310 of FIG. 3A, as having four microphone receivers 320. The tracking range from the receivers 320 may be determined by how close together they are on the camera unit 310. Therefore, one embodiment of the camera unit 310 can have an increased size so that the microphone receivers 320 can be space farther apart. In other embodiments, more than four microphone receivers 320, for example 8 or more, can be used so that the receivers 320 may be able cover greater areas, such as areas of about 75×75 ft. In addition to using the ultrasound to track with the camera, embodiments of the ultrasound camera tracking system can also use voice tracking techniques, such as disclosed in U.S. Pat. No. 6,980,485, which is incorporated herein by reference.

Furthermore, other embodiments of the disclosed camera tracking system can use an ultrasonic receiver system having a plurality of remote receivers positioned at locations farther from one another in a larger venue. For example, FIG. 6A shows one embodiment of a camera tracking system 600A having an ultrasonic receiver system 620 in conjunction with the camera unit 610, control unit 630, and emitter unit 640. The ultrasonic receiver system 620 has a three or more receiver units 622, 624, 626 positioned around a room as opposed to having a small array of microphones on the control unit 630. The receiver units 622, 624, 626 can be at fixed, calculated distances from one another and can use wireless or wired communications with the control unit 630.

In one embodiment, Radio Frequency (RF) signals from one or more RF device 650 connected to the emitter unit 640 can be synced with the ultrasound from the transducers 642, 644 so the receiver units 622, 624, 626 can determine the distance of the emitter 640 from them. Synchronized use of RF signals and ultrasound with multiple receiver units 622, 624, 626 positioned around a room may lead to a more accurate position calculation of the emitter 640. For example, the RF signal synced with the ultrasound signal can improve accuracy of range detection of the transducers 642, 644, thereby improving the camera unit 610's automatic zoom.

Figure 7A:
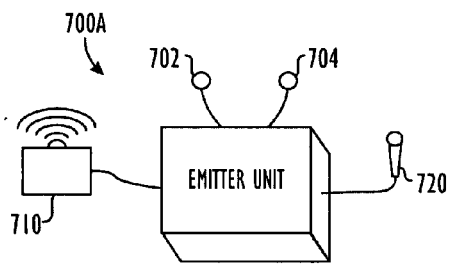
FIGS. 7A-7B illustrate alternative embodiments of emitter units for the disclosed camera tracking systems.

In one embodiment, an RF wireless microphone can be intergrated into the emitter unit 640 and can transmit RF signals used not only for voice in a videoconference or presentation but also for tracking and range detection. FIG. 7A shows an emitter unit 700A having one or more transducers 702, 704, an RF transmitter 710, and an integrated microphone 720, which can be a lapel microphone. The RF signals can be used to transmit a presenter's voice and also can be used for range detection of the emitter unit 700A. Having the integrate lapel microphone 720 also allows for a number of other alternatives. For example, the system 600A of FIG. 6A can direct the camera of the camera unit 610 based on voice mic gating techniques in combination with ultrasound from the transducers 642, 644 that are enabled when the integrated lapel microphone (720) detects the presenter's voice.

As shown in FIG. 6A, the presenter can have transducers 642, 644 on the front and back so the camera tracking system 600A can track the presenter in situations where the presenter turns. In an alternative also shown in FIG. 6A, the presenter can have the transducers 642, 644 on each shoulder so the camera tracking system 600A can track the presenter in situations where the presenter turns.

In previously discussed embodiments, the disclosed camera tracking systems have been described with reference to tracking one person wearing an ultrasonic emitter unit. In other embodiments of the disclosed system, multiple participants may be wearing emitter units, and the determination of which one of the participants is tracked can be controlled using various techniques. For example, FIG. 6B illustrate a camera tracking system 600B for use with multiple emitter units 640-A, 640-B. As before, the system 600B has the camera unit 610, the ultrasound receivers 620, and the control unit 630. The multiple emitter units 640-A, 640-B each include at least one ultrasound transducer 642. The emitter unit 640-A, 640-B is activated either automatically or manually to emit ultrasound so that the camera unit 610 will track the presenter with the activated transducers 642.

Figure 7B:
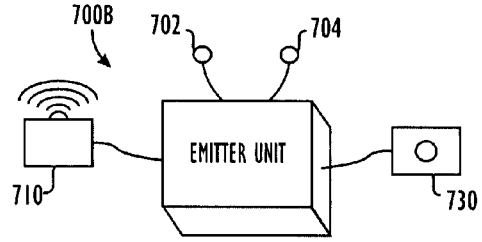

In one embodiment, the emitter unit 640-A, 640-B can be activated when a presenter speaks. For example, the emitter unit 700A of FIG. 7A may be activated when the integrated microphone 720 picks up the presenter speaking. In another embodiment, an emitter unit 700B shown in FIG. 7B may have a button on a tag 730 or the like that the presenter can press to activate the unit 700B and have the transducers 702, 704 emit ultrasound.

Returning to FIG. 6B, more than one of the emitter units 640-A, 640B may be actively emitting at the same time. For example, the emitter units 640-A, 640-B may be activated to emit ultrasound when the participant is speaking as detected by a lapel microphone. When two or more participants are speaking at the same time, the control unit 630 in one embodiment can control the camera unit 610 to frame both of the presenters having active emitter units 640-A, 640-B.

In an alternative embodiment, the emitter units 640-A, 640-B may be able to communicate with each other or with the control unit 630 using RF or IR signals so that only one emitter unit 640-A or 640-B is emitting ultrasound at one time. In one example, the actuated emitter unit 640-A may send an RF signal to the other emitter unit 640-B, which may then stop emitting ultrasound.

In another example, the system 600-B may include an RF unit 670 coupled to the control unit 630. When the presenter actuates his emitter unit 640-A, an RF signal may be transmitted from an RF transmitter (not shown) on the emitter unit 640-A to the RF unit 670 so that the control unit 630 knows that this particular presenter will now be tracked. The control unit 630 can then relay an RF signal from the RF unit to the other emitter unit 640-B to stop it from emitting ultrasound. In this way, only one emitter unit 640-A will produce ultrasound at one time, and the control unit 630 need not try to differentiate to ultrasound from two or more emitter units 640. Instead of RF signals, IR signals or others could also be used to communicate.

In yet another embodiment, the control unit 630 may be able to differentiate multiple sources of ultrasound from the emitter units 640-A, 640-B depending on the characteristics of the ultrasound emitted. For example, each emitter unit 640 may emit ultrasound in only a distinct frequency range from the others so that the units 640 can be isolated from one another. Alternatively, each emitter unit 640 may emit ultrasound at distinct time intervals from the others so that the units 640 can be isolated from one another. When multiple emitters 640-A, 640-B operate simultaneously, the control unit 630 may need to receive an RF signal identifying which emitter unit 640 is activated to be tracked even though both of the emitter units 640-A, 640-B may continue emitting ultrasound.

In yet another embodiment, multiple independent tracking systems 600B may be used in the same environment with one intended to track one presenter and another intended to track another presenters. Each of the independent systems 600B can have different seeds using Phase Shift Keying (PSK)/Frequency Shift Keying (FSK) to distinguish the ultrasound associated with them.

The foregoing description of preferred and other embodiments is not intended to limit or restrict the scope or applicability of the inventive concepts conceived of by the Applicants. Reference to terms such as vertical, horizontal, right, left, etc. are provided for the purposes of indicating relative direction in one orientation and can refer to relative directions in other orientations as well. It will be appreciated that modification can be made to the embodiments disclosed herein and that additional embodiments can be implemented based on the teachings of the present disclosure. In addition to tracking a presenter with a camera in a videoconference, for example, the camera tracking system and associated methods of the present disclosure can be used in other implementations, such controlling spotlights for stage performances, controlling cameras for other environments, etc. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A camera tracking apparatus, comprising:
a first source emitting ultrasound and being portable with a first subject to be tracked;
a controllable camera;
a plurality of receivers being stationary with respect to the controllable camera and the first source and being at least responsive to ultrasound; and
a controller communicatively coupled to the controllable camera and the receivers, the controller configured to:
receive ultrasound signals communicated from the receivers in response to the ultrasound emitted from the first source,
process the ultrasound signals to determine an at least approximate location of the first source, and
control the controllable camera to direct at least approximately at the determined location of the first source while the receivers are stationary.

2. The apparatus of claim 1, wherein to control the controllable camera, the controller commands the controllable camera to perform one or more of: tilt, pan, or zoom at least approximately to the determined location of the first source.

3. The apparatus of claim 1, wherein each of the receivers comprise a microphone having a substantially flat frequency response within a range of about 24-kHz to about 40-kHz.

4. The apparatus of claim 3, wherein the ultrasound emitted from the first source comprises a tone sweeping in a range between about 24-kHz to about 40-kHz.

5. The apparatus of claim 3, wherein each of the microphones further comprises a frequency response within an audible range.

6. The apparatus of claim 1, wherein the first source comprises a portable emitter having one or more ultrasonic transducers.

7. The apparatus of claim 1, wherein to process the ultrasound signals, the controller is configured to pre-process the ultrasound signals to remove portions of the ultrasound signals caused by reflection.

8. The apparatus of claim 1, wherein to pre-process the ultrasound signals to remove portions of the ultrasound signals caused by reflection, the controller is configured to:
down sample the ultrasound signals,
filter the down sampled signals to substantial impulses, and
zero portions of the filtered signals to remove the portions of the ultrasound
signals caused by reflection.

9. The apparatus of claim 1, wherein at least two of the receivers are positioned along an axis with respect to the first source, and wherein to process the ultrasound signals to determine the at least approximate location of the first source, the controller is configured to:
calculate an approximate location of the first source along the axis using differences in the ultrasound signals between the at least two receivers, and
determine a variable for controlling the controllable camera based on the approximate location along the axis.

10. The apparatus of claim 1, further comprising memory storing a plurality of variables for candidate locations, the controller communicatively coupled to the memory and using the variables to process the ultrasound signals and determine the at least approximate location of the first source.

11. The apparatus of claim 1, wherein the first source has a first ultrasonic transducer positionable on one side of the first subject tracked by the camera and has a second ultrasonic transducer positionable on an opposite side of the first subject, whereby the first and second ultrasonic transducers enable the receivers to receive ultrasound when the first subject is oriented with either side relative to the receivers.

12. The apparatus claim 1, wherein the first source comprises at least one radio frequency transmitter transmitting radio frequency signals, and wherein the controller is configured to use the radio frequency signals to determine a range of the first subject from the controllable camera.

13. The apparatus of claim 12, wherein the at least one radio frequency transmitter also transmits voice signals of the first subject to the controller.

14. The apparatus of claim 1, further comprising one or more second sources separate from the first source and emitting ultrasound, each of the second sources being portable with one or more second subjects to be tracked by the camera.

15. The apparatus of claim 14 wherein each of the first and second sources detects voice from its subject and transmits ultrasound when activated by the detected voice.

16. The apparatus of claim 15, wherein each of the first and second sources when activated transmits a signal to at least one of the other sources to stop emitting ultrasound.

17. The apparatus of claim 14, wherein each of the first and second sources transmits ultrasound in a separate detectable range from the other sources.

18. The apparatus of claim 14, wherein the controller is configured to control the camera to position each of the first and one or more second subjects in a viewable area of the camera for those first and one or more second sources emitting ultrasound signals at the same time.

19. A camera tracking method, comprising:
emitting ultrasound with a first source being portable with a first subject to be tracked;
receiving the ultrasound with a plurality of separate channels, each of the separate channels associated with a receiver being stationary relative to the first source;
determining an at least approximate location of the first source by processing the ultrasound received with the separate channels; and
controlling a camera movable relative to the receivers to at least approximately direct at the determined location of the first source while the receivers are stationary.

20. The method of claim 19, wherein receiving ultrasound with the plurality of separate channels comprise responding to ultrasound in a range of about 20-kHz to about 40-kHz at each of the separate channels.

21. The method of claim 19, wherein processing the ultrasound received with the separate channels comprises removing portions of the ultrasound signals caused by reflection.

22. The method of claim 14, wherein removing the portions of the ultrasound caused by reflection comprises:
down-sampling signals of the ultrasound at each of the separate channels;
filtering the down sampled signals to substantial impulses; and
zeroing portions of the filtered signals to remove the portions of the signals caused by reflection.

23. The method of claim 19, wherein determining the at least approximate location of the first source comprises calculating a variable for controlling the camera based on differences in ultrasound signals received by at least two of the separate channels arranged along an axis with respect to the first source.

24. A non-transitory program storage device, readable by a programmable control device, comprising instructions stored on the program storage device for causing the programmable control device to perform a camera tracking method, the method comprising:

emitting ultrasound with a first source being portable with a first subject to be tracked;

receiving the ultrasound with a plurality of separate channels, each of the separate channels associated with a receiver being stationary relative to the first source;

determining an at least approximate location of the first source by processing the ultrasound received with the separate channels; and controlling a camera movable relative to the receivers to at least approximately direct at the determined location of the first source while the receivers are stationary.

25. A camera tracking system, comprising:

an emitter unit having at least one ultrasonic transducer emitting ultrasound and being portable to track a subject;

a moveable camera;

a plurality of microphones being stationary relative to the emitter unit and the movable camera and being capable of at least responding to ultrasound emitted by the at least one ultrasonic transducer; and a control unit communicatively coupled to the moveable camera and the microphones, the control unit receiving ultrasound signals communicated from the microphones in response to ultrasound detected from the at least one ultrasonic transducer, the control unit processing the ultrasound signals to determine an at least approximate location of the at least one ultrasonic transducer and controlling the moveable camera to direct at least approximately at the determined location while the microphones are stationary.

* * * * *

UNITED STATES PATENT AND TRADEMARK OFFICE
CERTIFICATE OF CORRECTION

| | | |
|---|---|---|
| PATENT NO. | : 8,249,298 B2 | Page 1 of 1 |
| APPLICATION NO. | : 11/872303 | |
| DATED | : August 21, 2012 | |
| INVENTOR(S) | : Youssef Saleh et al. | |

It is certified that error appears in the above-identified patent and that said Letters Patent is hereby corrected as shown below:

In column 17, line 42, in Claim 8, delete "claim 1" and insert -- claim 7, --, therefor.

In column 18, line 52, in Claim 22, delete "claim 14" and insert -- claim 21, --, therefor.

Signed and Sealed this
Fourth Day of December, 2012

David J. Kappos
*Director of the United States Patent and Trademark Office*